March 19, 1935. C. D. REED 1,994,667
WRAPPER FOR EDIBLES
Filed May 26, 1934

CLARENCE DICKINSON REED
INVENTOR
PER *Walter C. Hughes*
ATTORNEY

Patented Mar. 19, 1935

1,994,667

UNITED STATES PATENT OFFICE 1,994,667

WRAPPER FOR EDIBLES

Clarence Dickinson Reed, Chicago, Ill., assignor to Reed Candy Company, Chicago, Ill., a corporation of Illinois Application May 26, 1934, Serial No. 727,599

2 Claims. (Cl. 206—46)

Wrappers for edibles of which the following is a specification. Such edibles as candies of the type commonly referred to as suckers or lolly pops and frozen ices or ice cream are supplied with flexible or non-rigid handles inserted therein.

Edibles of this type are customarily impaled on rigid wooden sticks or skewers, the sharp ends of the sticks being inserted in the edibles while they are in a plastic state and being molded into various shapes such as round, square, cylindrical, etc.

The manner of wrapping such edibles in paper coverings is to fold the wrapper around the edible and twist the wrapper around the stick at the point where it enters the edible.

This method of wrapping cannot be successfully employed with candies or other edibles which have non-rigid or flexible handles for the reason that such handles are in the form of a U or loop with the ends inserted in the edible and the twisting of the wrappers around the flexible handles at the point where the handles are inserted in the edibles would twist the wrappers and the handles in such manner as to create a tension developed by the twisting motion which when released would cause the wrappers to untwist, become loosened, and disengaged from the handles and the handles to untwist and become disengaged from the edibles.

Obviously the wrapping is for sanitary and protective purposes as well as enhancing the appearance of the edibles and any tendency of the wrapper to become easily disengaged from the edible greatly detracts from its salability and the disengaging of the ends of the flexible handles makes the edible unsalable.

The object of my invention is to provide an improved wrapping for candies or other edibles of the type mentioned, whereby the wrappers will closely remain on the edibles until such time as they may be removed by the purchaser thereby assuring the neat and attractive appearance of the edibles and enhancing their salable qualities and the ends of the handles to remain firmly inserted in the edibles.

In my invention I use paper or like material of proper dimensions to suitably wrap the candies or other edibles. The lower end of the wrapper is folded upwardly, the sides folded laterally over each other and the upper end of the folded wrapper which extends beyond the uppermost part of the candy or other edibles is slit or cut through in a manner substantially parallel to the sides of the wrapper and approximately one-fifth of the entire length of the wrapper, after which the bifurcated ends are folded around the flexible handle and downwardly into close contact with the wrapper as previously folded and drawn taut thereon.

I now explain the details of my invention and its essential features as illustrated in the drawing and set forth in the claims and for this purpose only I use in the description of my invention and drawing the word "Candy" and illustrations of the type of candy commonly referred to as suckers or lolly pops, but it is specifically understood that my invention is not limited to the use thereof on candy or confectionery, but also includes the use thereof on any other kind of edible with flexible or non-rigid handles such as ice cream, frozen ices, "Popsicles" and like edibles.

Figure 1:
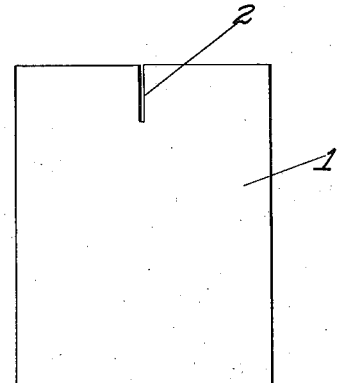
Fig. 1 is a detail of the wrapper embodying my invention.
Figure 2:
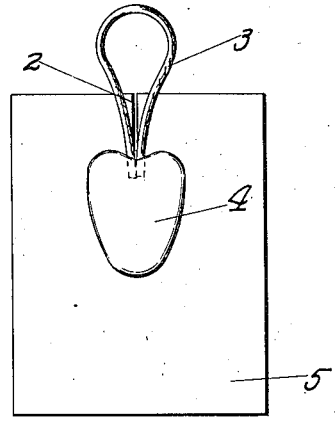
Fig. 2 is a plan view showing the candy as applied upon the wrapper.
Figure 3:
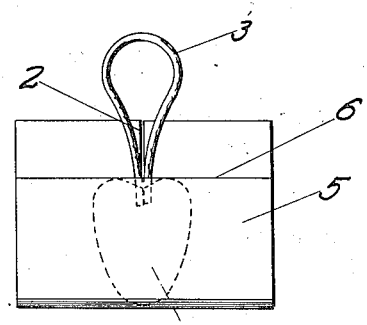
Figs. 3, 4 and 5 illustrate successive foldings in applying the wrapper to the candy.
Figure 4:
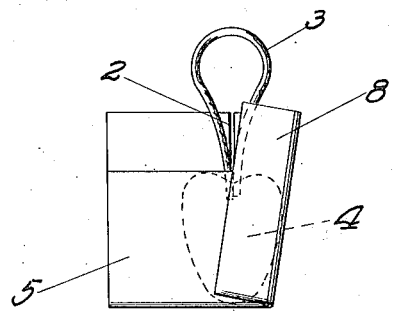
Figure 5:
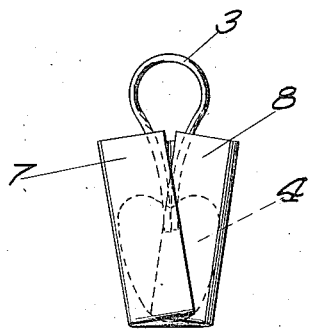
Figure 6:
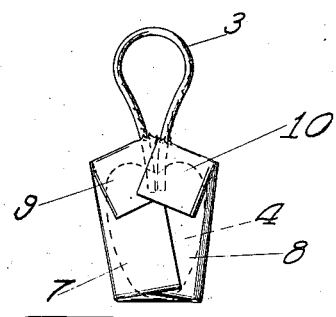
Fig. 6 illustrates the method of folding down the bifurcated ends of the wrapper over the side folds of the wrapper, thus completing the wrapping process.

In my invention I provide a wrapper 1, which may be waxed paper or other like material which is slit 2, or cut through at one end and adapted to receive the handle 3, of the candy 4, such as a sucker or lolly pop after which the lower portion of the wrapper is folded over the candy as shown in that portion 5, between 2 and 6 as illustrated in Fig. 3, the lateral portions of the wrapper 7 and 8 extending from both sides of the candy 4, are folded as shown in Fig. 4 and Fig. 5, the upper bifurcated ends 9 and 10 are then folded around the flexible handle 3 and over the side folds 7 and 8 as shown in Fig. 6.

The candy is thus wrapped in a substantial manner, the wrapper remains thereon until removed by the purchaser and the flexible handle is not disengaged nor loosened.

Having now described my invention, what I claim is:—

1. The combination of a candy or other edible having a flexible or non-rigid handle inserted therein with a wrapper comprising a sheet of paper or like material having a slit therein at one end thereof at the center and parallel to the sides of said wrapper, the flexible or non-rigid handle projecting through the slit and the bifurcated ends of the wrapper folded around said flexible or non-rigid handle.

2. The combination of a candy or other edible having a flexible or non-rigid handle inserted therein with a wrapper comprising a sheet of paper or like material having a slit in one end thereof at the center and parallel to the sides of said wrapper, the flexible or non-rigid handle of the candy or other edible projecting through the slit, the lower portion of the wrapper folded upwardly over the candy, the side portions of the wrapper folded laterally over the candy, the bifurcated ends of the wrapper folded downwardly around the flexible or non-rigid handle and folded over the folded side portions and folded lower end of the wrapper.

CLARENCE DICKINSON REED.